(12) United States Patent
Sato

(10) Patent No.: US 9,247,096 B2
(45) Date of Patent: Jan. 26, 2016

(54) IMAGE READING APPARATUS AND IMAGE READING METHOD

(75) Inventor: Kuniaki Sato, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/591,529

(22) Filed: Aug. 22, 2012

(65) Prior Publication Data

US 2013/0050783 A1    Feb. 28, 2013

(30) Foreign Application Priority Data

Aug. 31, 2011  (JP) .................................. 2011-188637

(51) Int. Cl.
| | |
|---|---|
| *H04N 1/04* | (2006.01) |
| *H04N 1/203* | (2006.01) |
| *H04N 1/00* | (2006.01) |
| *H04N 1/12* | (2006.01) |
| *H04N 1/193* | (2006.01) |

(52) U.S. Cl.
CPC ......... *H04N 1/2032* (2013.01); *H04N 1/00652* (2013.01); *H04N 1/12* (2013.01); *H04N 1/193* (2013.01); *H04N 2201/0081* (2013.01)

(58) Field of Classification Search
None
See application file for complete search history.

(56) References Cited

U.S. PATENT DOCUMENTS

| | | |
|---|---|---|
| 5,154,411 A | 10/1992 | Saito et al. |
| 5,196,885 A | 3/1993 | Takeuchi et al. |
| 5,450,170 A | 9/1995 | Kimizuka et al. |
| 5,481,336 A | 1/1996 | Tachibana et al. |
| 6,487,379 B2 | 11/2002 | Sato |
| 6,496,660 B2 | 12/2002 | Takahashi et al. |
| 6,785,478 B2 | 8/2004 | Takahashi et al. |
| 2009/0040560 A1* | 2/2009 | Yukiura et al. ............... 358/1.16 |
| 2011/0128597 A1* | 6/2011 | Ishido ........................... 358/498 |
| 2011/0188085 A1* | 8/2011 | Oosaki et al. ................ 358/1.17 |
| 2011/0211238 A1* | 9/2011 | Sahara .......................... 358/498 |
| 2012/0161382 A1 | 6/2012 | Morinaga et al. |
| 2012/0161383 A1 | 6/2012 | Sato et al. |

FOREIGN PATENT DOCUMENTS

| | | |
|---|---|---|
| JP | S60-100871 | 6/1985 |
| JP | H07-221928 | 8/1995 |

* cited by examiner

*Primary Examiner* — Helen Q Zong
(74) *Attorney, Agent, or Firm* — Fitzpatick, Cella, Harper & Scinto (57) ABSTRACT

An image reading apparatus and an image reading method are provided by which a top face image and a back face image of a document can both have an improved reading accuracy while simplifying a circuit configuration and providing a higher processing speed. A period within which a reading operation is interrupted is set based on a relation with a free capacity of a buffer memory so as to avoid a period within which the top face image and the back face image of the document are both read.

14 Claims, 6 Drawing Sheets

IMAGE READING APPARATUS AND IMAGE READING METHOD

BACKGROUND OF THE INVENTION

1. Field of the Invention

The present invention relates to an image reading apparatus and an image reading method for reading images on a top face and a back face of a document.

2. Description of the Related Art

As an image reading apparatus, there is an image reading apparatus in which images on a top face and a back face of a document conveyed by an ADF (auto document feeder: automatic document conveyance apparatus) are simultaneously read by two reading sensors to transfer the read image data to a host computer. In the image reading apparatus (scanner) as described above, there may be a case where the rate at which the document image is read is higher than the rate at which the image data is transferred to the host computer. In this case, the read image data is temporarily accumulated in a buffer memory (storage unit) in the reading apparatus to sequentially transfer the accumulated image data to the host computer. When an excessive amount of image data is accumulated in the buffer memory, then the image reading processing is suspended. Then, after the buffer memory is emptied, the image reading processing is resumed. The suspension of the document reading processing as described above is called a SS processing (start-stop processing).

When the SS processing as described above is carried out, the continuity of the image reading processing may be lost, thus causing the read image to have a deteriorated image quality. When the SS processing is performed during the reading of a document image by one reading sensor of two reading sensors positioned in a document conveyance path, an approach may be used, as disclosed in Japanese Patent Laid-Open Publication No. S60-100871 (1985), to delay the image reading processing at the resumption of the reading processing. Specifically, when the document after the stoppage of the conveyance is conveyed again and the reading processing is resumed, the image data corresponding to a predetermined number of already-read lines can be processed so as to be prevented from being read again, thus maintaining the continuity of the image reading processing. Japanese Patent Laid-Open Publication No. H7-221928 (1995) discloses a configuration according to which, when the memory buffer is full, the SS processing is also performed when the two reading sensors are used to read the images on a top face and a back face of a document.

When the SS processing is performed during the reading by the two reading sensors of the images on a top face and a back face of a document, a document behavior may cause, during the resumption of the reading processing, a difference between the number of lines in the top face image and the number of lines in the back face image that should be processed so as to avoid an overlapped image data reading. On the other hand, a common correction unit may be included as a correction unit for correcting a read image by processing, at the resumption of the reading processing, the top face image data and the back face image data so as to avoid an overlapped reading of the respective pieces of data. The provision of the common correction unit is advantageous in simplifying the circuit configuration and the increase of the processing speed.

However, the provision of the common correction unit for the image data of the top face and the back face requires one number of lines to be processed by the correction unit. Thus, at least one of the images of the top face image and the back face image may be incorrectly connected, thus causing a risk of a read image having a deteriorated quality.

SUMMARY OF THE INVENTION

The present invention provides an image reading apparatus and an image reading method by which, while providing a simplified circuit configuration and a higher processing speed, a top face image and a back face image of a document can be both read with an improved reading accuracy.

In the first aspect of the present invention, there is provided an image reading apparatus, comprising:

a conveyance unit configured to convey a document along a conveyance path;

a first reading sensor and a second reading sensor configured to read images of a top face and a back face of the document conveyed by the conveyance unit;

a transfer unit configured to transfer image data from a buffer memory after the image data is read by the first reading sensor and the second reading sensor and temporarily accumulated in the buffer memory; and a control unit configured to perform an interruption processing for interrupting the conveying of the document by the conveyance unit and the reading of the image by the first reading sensor and the second reading sensor, wherein anyone of the first reading sensor and the second reading sensor reads the image during a first period and both of the first reading sensor and the second reading sensor read the image during a second period, and when the buffer memory has, within the first period before the second period, a free capacity smaller than a capacity required for the first reading sensor and the second reading sensor to read the images during the second period, the control unit performs the interruption processing in the first period before the second period so as to avoid the second period by performing the interruption processing.

In the second aspect of the present invention, there is provided an image reading apparatus, comprising:

a conveyance unit configured to convey a document along a conveyance path;

a first reading sensor and a second reading sensor configured to read images of a top face and a back face of the document conveyed by the conveyance unit;

a reading unit configured to cause the conveyance unit to convey the document, to cause any one of the first reading sensor and the second reading sensor to read the image during a first period, and to cause both of the first reading sensor and the second reading sensor to read the image during a second period following the first period;

an accumulating unit configured to accumulate image data read by the first reading sensor and the second reading sensor; and an interrupting unit configured to perform an interruption processing for interrupting, before the reading unit starts the reading of the image in the second period, the conveying of the document by the conveyance unit and the reading of the image by the first reading sensor and the second reading sensor on the basis of an amount of the image data able to be accumulated in the accumulating unit in the first period.

In the third aspect of the present invention, there is provided an image reading method, comprising the steps of:

reading, by a first reading sensor and a second reading sensor, images on a top face and a back face of a document conveyed along a conveyance path;

transferring image data from a buffer memory after the image data is read by the first reading sensor and the second reading sensor and temporarily accumulated in the buffer memory; and performing an interruption processing for interrupting the conveyance of the document by the conveyance unit and the reading of the image by the first reading sensor and the second reading sensor, wherein any one of the first reading sensor and the second reading sensor reads the image during a first period and both of the first reading sensor and the second reading sensor read the image during a second period, and when the buffer memory has, within the first period before the second period, a free capacity smaller than a capacity required for the first reading sensor and the second reading sensor to read the images during the second period, the interruption processing is performed in the first period before the second period so as to avoid the second period by performing the interruption processing.

According to the present invention, a period during which the reading operation is interrupted is set so as to avoid a period during which a top face image and a back face image of a document are both read. By the setting of the interrupting period as described above, while providing a simplified circuit configuration and a higher processing speed, the top face image and the back face image of the document can be both read with an improved reading accuracy.

Further features of the present invention will become apparent from the following description of exemplary embodiments (with reference to the attached drawings).

DESCRIPTION OF THE EMBODIMENTS

The following section will describe an embodiment of the present invention with reference to the drawings. The image reading apparatus of the present invention may be incorporated as a component of an image printing apparatus such as a copier, a printer, a facsimile, and a complex machine thereof for example. In this case, based on image data read by the image reading apparatus, an image printing unit of the image printing apparatus prints the image on a printing medium. For example, the image read by the image reading apparatus can be copied by an image formation unit to a printing medium. Then, the image can be transmitted to an external device via a communication unit of the image printing apparatus.

In the following embodiment, the size, material and form of components as well as the relative arrangement thereof may be appropriately changed depending on the configuration of the apparatus to which the present invention is applied and various conditions. Unless otherwise specified, the scope of the present invention is not limited thereto.

(First embodiment)

Figure 1:
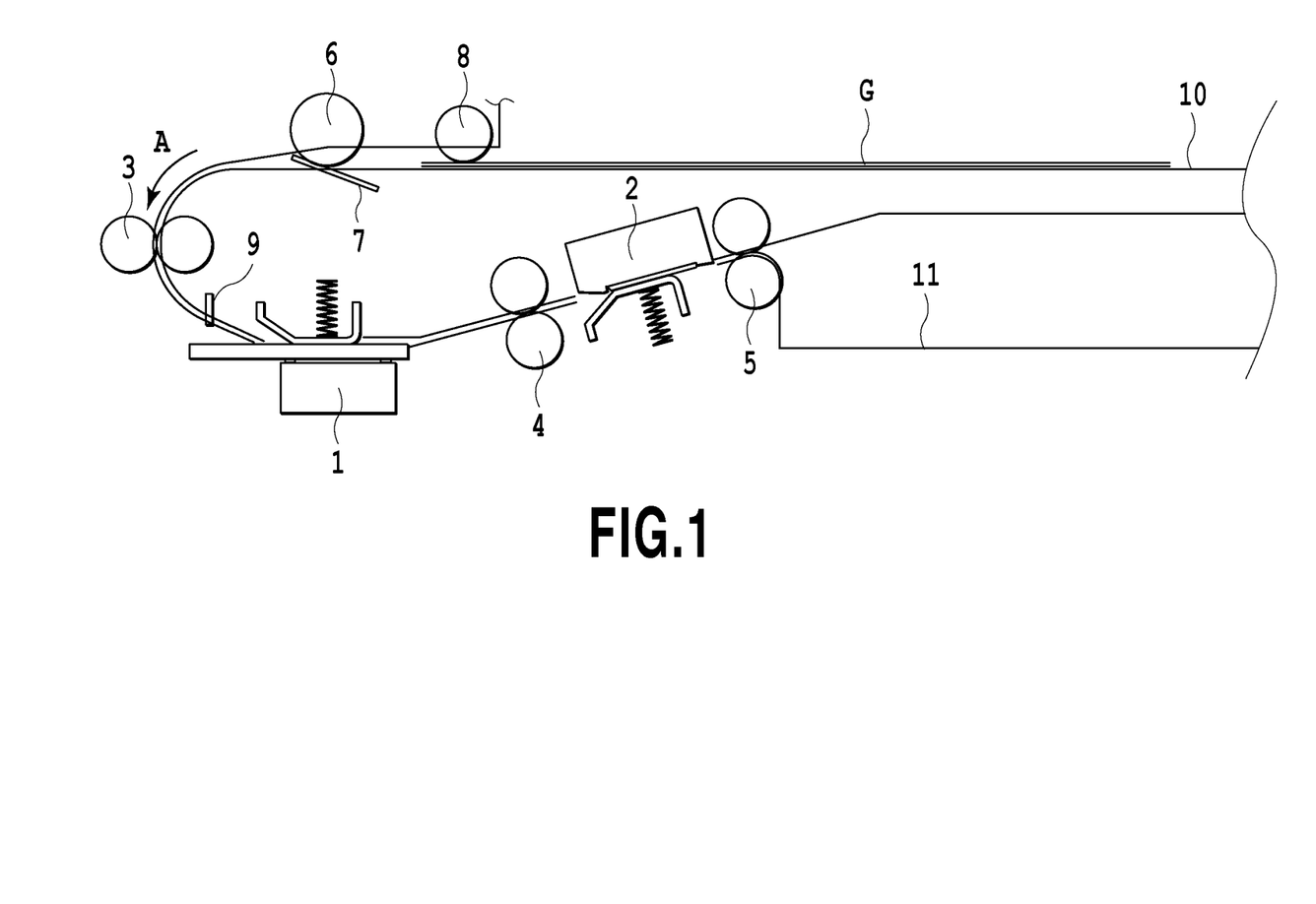
FIG. 1 is a schematic view illustrating the main part of an image reading apparatus in the first embodiment of the present invention.

FIG. 1 is a schematic view illustrating the configuration of the image reading apparatus of the first embodiment. The reference numeral 1 denotes a top face reading sensor (first reading sensor) to read an image on a top face of the document G. The reference numeral 2 denotes a back face reading sensor (second reading sensor) to read an image on a back face of the document G. The reference numeral 3 denotes the first pair of conveyance rollers. The reference numeral 4 denotes the second pair of conveyance rollers. The reference numeral 5 denotes the third pair of conveyance rollers. The reference numeral 6 denotes a separation roller. The reference numeral 8 denotes a pickup roller. These rollers are driven to rotate by a pulse motor functioning as a driving source (not shown). The reference numeral 7 denotes a separation pad. The reference numeral 9 denotes a document edge sensor to sense an anterior end and a posterior end of the document G. The reference numeral 10 denotes a document placement tray. The reference numeral 11 denotes a document output tray. These trays 10 and 11 have therebetween a line for conveying the document G. A plurality of documents G placed in the document placement tray 10 are sent one by one, as described later, by the pickup roller 8, the separation roller 6, and the separation pad 7 in the direction shown by the arrow A. The documents G are continuously conveyed by the pairs of conveyance rollers 3, 4 and 5, and are finally discharged into the document output tray 11.

Based on the driving pulse number of the pulse motor as a driving source and the timing at which the document edge sensor 9 senses the anterior and posterior ends of the document G, distances between the top face reading sensor 1 and the anterior and posterior ends of the document G as well as distances between the back face reading sensor 2 and the anterior and posterior ends of the document G can be acquired. The top face reading sensor 1 is configured so as to be able to move in the left-and-right direction in FIG. 1. When an image on a fixed document that cannot be conveyed is read, the image of the document placed on a glass (not shown) can be read by allowing the image to be scanned by the top face reading sensor 1 from the left side to the right side in FIG. 1.

Figure 2:
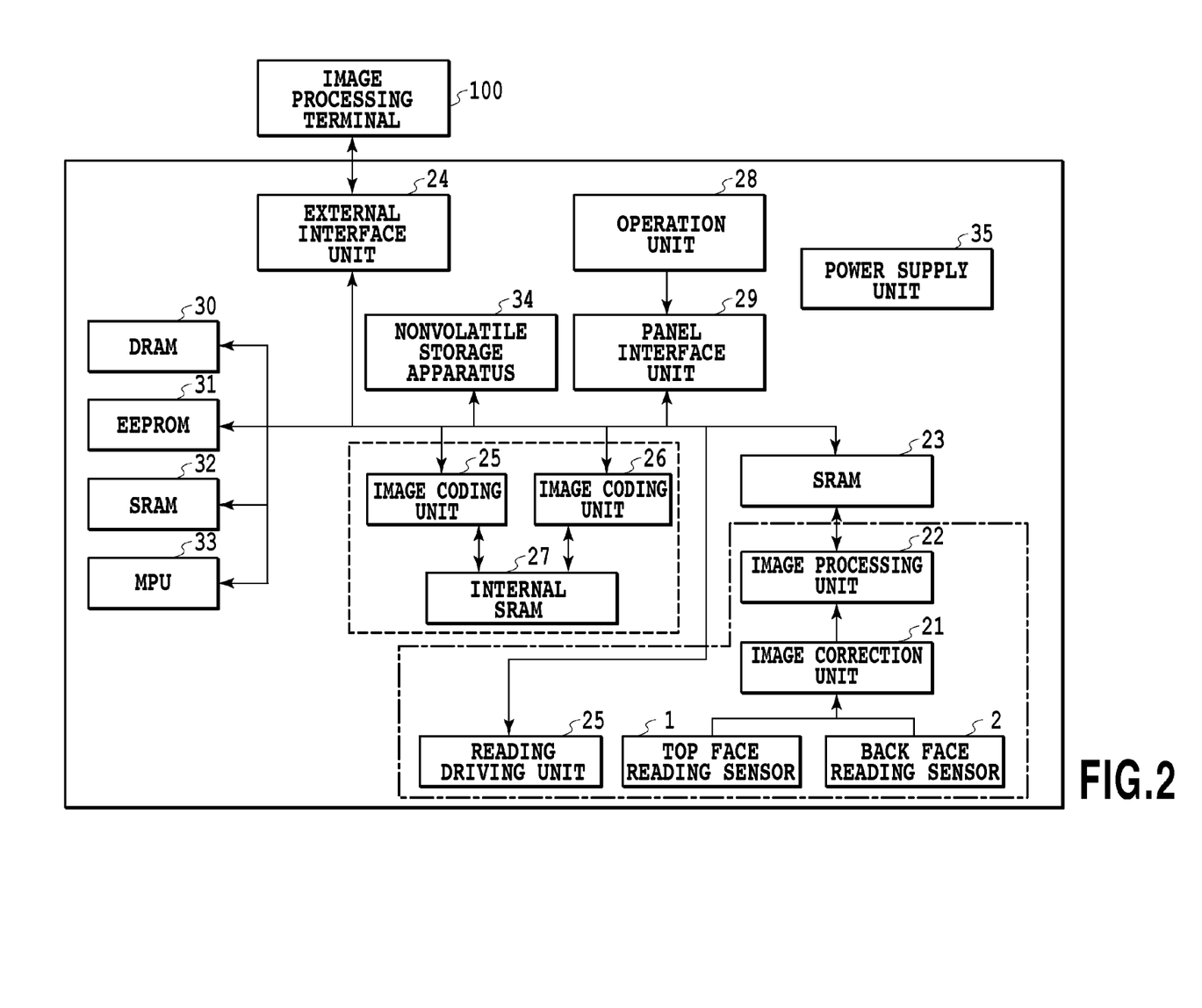
FIG. 2 is a block diagram illustrating the configuration of the control system of the image reading apparatus of FIG. 1.

FIG. 2 is a block diagram illustrating a configuration of a control system of the image reading apparatus of FIG. 1.

The image data read by the top face reading sensor 1 and the back face reading sensor 2 is temporarily accumulated in a SRAM 23 via an image correction unit 21 and an image processing unit 22. The SRAM 23 functions as a buffer memory. The accumulated image data can be divided by an image processing unit 22 to the top face image data and the back face image data. The top face image data and the back face image data obtained through the division are outputted through an external interface unit 24 to an external image processing terminal 100. When the document images are read by the top face reading sensor 1 and the back face reading sensor 2 at a higher speed than the transfer speed by the external interface unit 24, then the image data read by these sensors is accumulated in the SRAM 23. In such a case, the overflow of the SRAM 23 must be avoided by performing the above-described SS processing (start-stop processing; interruption processing).

When the document is conveyed again after the stoppage of the conveyance by the SS processing to resume the reading processing, the image correction unit 21 performs a processing so as to prevent already-read image data corresponding to a predetermined number of lines from being read in an overlapped manner. Specifically, the image reading processing at the resumption of the reading processing is delayed so as to maintain the continuity of the image reading processing. The image correction unit 21 of this example is commonly provided as a correction unit for correcting the top face image data and the back face image data. Thus, the image correction unit 21 sets a single number of lines as a predetermined number of lines to be processed so as to be prevented from being read in an overlapped manner. This can consequently provide a simplified circuit configuration and a higher processing speed.

The reference numeral 36 denotes a reading driving unit including a document conveyance mechanism for example. The reference numerals 25, 26, and 27 denote image coding units for the coding processing of image data and an internal SRAM, respectively. The reference numeral 28 denotes an operation unit for operating the image reading apparatus (e.g., an operation panel). The reference numeral 29 denotes a panel interface unit for the operation unit 28. The reference numerals 30, 31, 32, and 33 denote DRAM, EEPROM, SRAM, and MPU, respectively. The MPU 33 (control unit) performs a processing described later for setting the timing at which the SS processing is carried out, and controls the entirety or a part of the functions of the reading apparatus. The reference numeral 34 denotes a nonvolatile storage apparatus. The reference numeral 35 denotes a power supply unit 35 for supplying power to the image reading apparatus.

Figure 3:
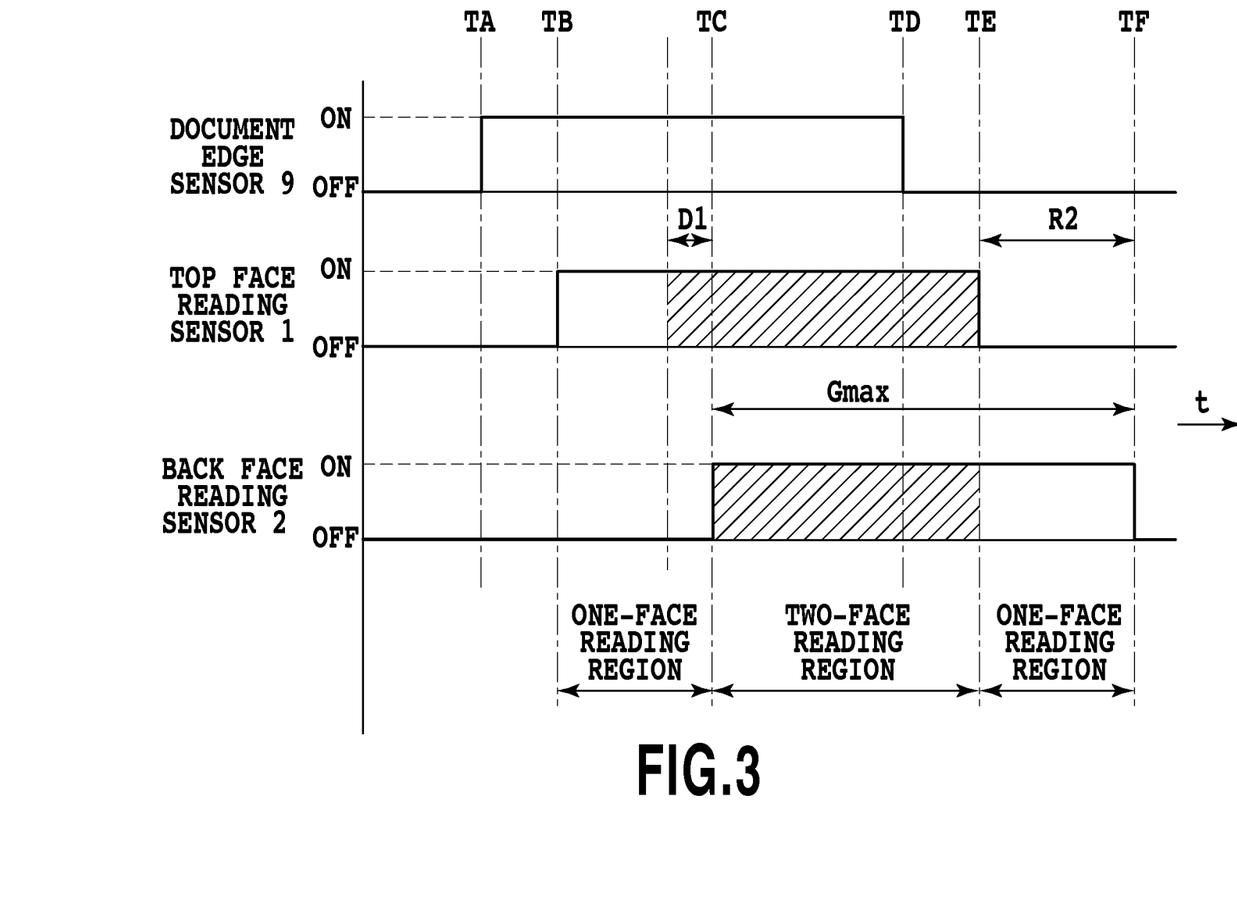
FIG. 3 is a timing chart for explaining the timing at which an image is read in the first embodiment of the present invention.

FIG. 3 is a timing chart for explaining the states of the sensors 1, 2, and 9 when one document G is conveyed from the document placement tray 10. Specifically, FIG. 3 illustrates, in a time-series manner, the state of the sensing by the document edge sensor 9 of the existence or non-existence of the document G, the state of the reading by the top face reading sensor 1, and the reading state by the back face reading sensor 2.

TA shows the timing at which the anterior end of the first document G reaches the position of the document edge sensor 9 and the anterior end is detected. TB shows the timing at which the anterior end of the document G reaches the position of the top face reading sensor 1 and the reading of the top face image of the document G is started. TC shows the timing at which the anterior end of the document G reaches the position of the back face reading sensor 2 and the reading of the back face image of the document G is started. TD shows the timing at which the posterior end of the document G passes the position of the document edge sensor 9 and the document G is no more detected. TE shows the timing at which the posterior end of the document G passes the position of the top face reading sensor 1 and the reading of the top face image of the document G is completed. TF shows the timing at which the posterior end of the document G passes the position of the back face reading sensor 2 and the reading of the back face image of the document G is completed.

Next, the following section will describe an operation to convey the document G and an operation to read an image.

By a driving source (not shown), the respective pairs of rollers 3, 4, and 5 as well as the rollers 6 are 8 are driven to rotate. First, the pickup roller 8 preliminarily separates, from among the documents G placed in the document placement tray 10, the ones placed at the upper side. Thereafter, the top-side documents G preliminarily separated by the separation roller 6 and the separation pad 7 are separated one by one to separate and send the uppermost document G. The first separated document G is conveyed along a U-turn path in FIG. 1 (U-like convey path) and is conveyed by the first pair of conveyance rollers 3 to the reading portion of the top face reading sensor 1. Thereafter, the document G is conveyed by the second pair of conveyance rollers 4 to the reading portion of the back face reading sensor 2 and is subsequently discharged by the third pair of conveyance rollers 5 into the document output tray 11.

At the timing at which the posterior end of the first document G passes the separation roller 6, the conveyance of the second document G is started. The interval between the posterior end of the precedent document G and the anterior end of the subsequent document G changes depending on various conditions. Specifically, the distance between the posterior end of the precedent document G and the anterior end of the subsequent document G changes depending on a difference in the circumferential velocity between the first pair of conveyance rollers 3 and the separation roller 6, mechanical timers (not shown) provided in the pickup roller 8 and the separation roller 6, or the conveyance slip of the first pair of conveyance rollers 3, the separation roller 6, or the pickup roller 8. As described above, the interval between documents has a predetermined variation that cannot be changed actively.

When the document G is conveyed by a predetermined amount R1 since the document edge sensor 9 senses the anterior end of the document G, the top face reading sensor 1 starts an operation to read the top face image of the document G. Thereafter, when the document G is further conveyed by a predetermined amount R2, the back face reading sensor 2 starts an operation to read the back face image of the document G. The predetermined amounts R1 and R2 will be described later. Since the document edge sensor 9 sensed the posterior end of the document G during the reading operation by the top face reading sensor 1, the top face reading sensor 1 reads the top face image corresponding to the predetermined amount R1 and then completes the reading of the top face image of the document G. When document G is further conveyed by the predetermined amount R2, the back face reading sensor 2 completes the reading of the back face image of the document G. During this period, when the document edge sensor 9 senses the anterior end of the next document G, after the next document G is conveyed by a predetermined amount R1, the top face reading sensor 1 starts an operation to read the top face image of the next document G. Thereafter, when the next document G is further conveyed by the predetermined amount R2, the back face reading sensor 2 starts the operation to read the next document G. The image reading operation as described above is repeated until there is no more documents in the document placement tray 10.

A risk of a deteriorated read image may be caused when the conveyance of the document G is stopped due to the SS processing for example within the zone from timing TC to the timing TE in FIG. 3 within which the reading operations by the top face reading sensor 1 and by the back face reading sensor 2 are overlapped. The reason is that, depending on the degree of the curve of the document G, a difference is caused in the continuity of the top face image and the back face image at the resumption of the conveyance of the document G.

In the following description, it is assumed that a period during which an image is read by both of the top face reading sensor 1 and the back face reading sensor 2 is called a "second period". A region within which the document is conveyed within the second period (the zone from the timing TC to the timing TE in FIG. 3) is called a "two-face reading region" (second region). A period within which an image is read by one of the top face reading sensor 1 and the back face reading sensor 2 is called a "first period". A region within which the document is conveyed within the first period (the zone from the timing TB to the timing TC and the zone from the timing TE to the timing TF in FIG. 3) is called a "one-face reading region" (first region).

Figure 4A:
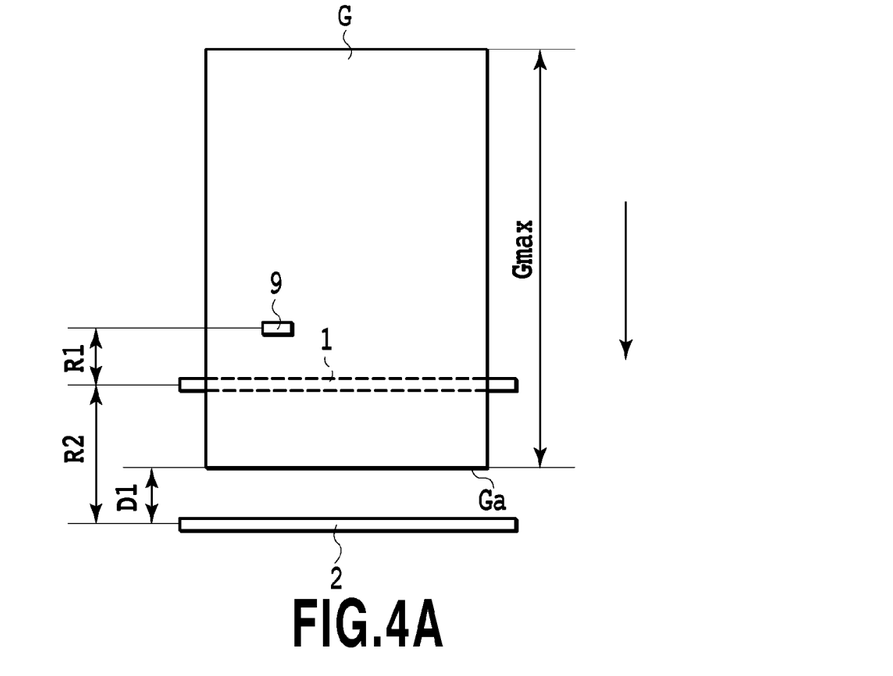
FIG. 4A and FIG. 4B are a schematic plan view illustrating a document at a different conveyance position in the first embodiment of the present invention, respectively.
Figure 4B:
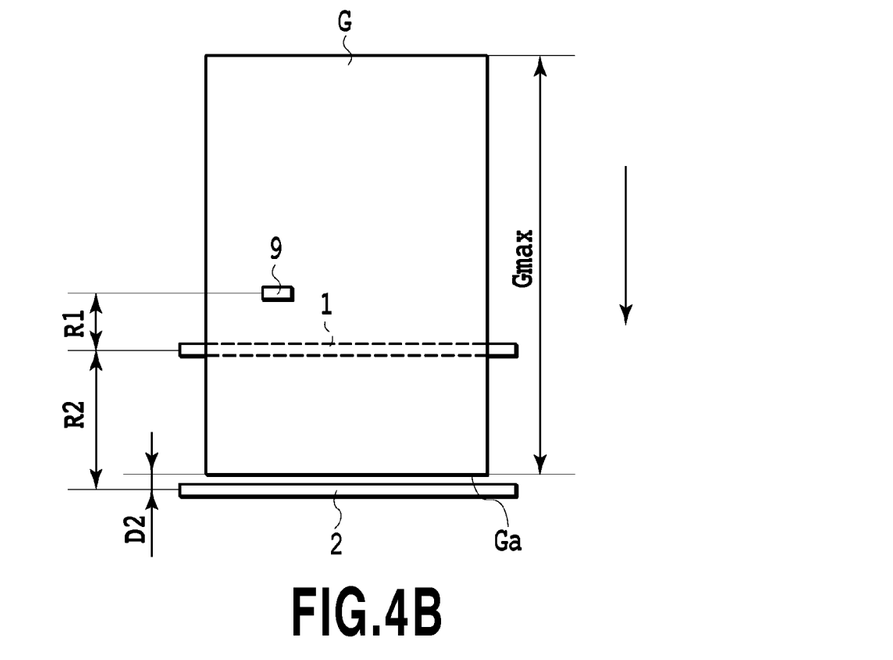

In this embodiment, the control as described below is performed in order to prevent a deteriorated read image due to the SS processing. FIG. 4A and FIG. 4B are a plan view for explaining the control by showing the positional relation among the document G, the document edge sensor 9, the top face reading sensor 1, and the back face reading sensor 2.

The positions of the top face reading sensor 1 and the back face reading sensor 2 are fixed and the document G is conveyed in the direction shown by the arrow. R1 shows a distance from the detection position of the document edge sensor 9 to the reading position of the top face reading sensor 1 (reading unit). R2 shows a distance from the reading position of the top face reading sensor 1 (reading unit) to the reading position of the back face reading sensor 2 (reading unit). These distances R1 and R2 are a value unique to the reading apparatus. The maximum length in the conveyance direction of the document that can be read by the reading apparatus of this example is assumed as Gmax.

FIG. 4A illustrates the state when the document G is within the zone from the timing TB to the timing TC in FIG. 3 (i.e., within the one-face reading region (first region)). D1 shows a distance required to securely stop the document G being conveyed at a position in front of the reading position of the back face reading sensor 2. At this timing, it is determined whether or not the SRAM 311 has a sufficient capacity required when an image having the length corresponding to $\{(Gmax-R2) \times 2+D1\}$ is read by the top face reading sensor 1 and the back face reading sensor 2. The length corresponding to $\{(Gmax-R2) \times 2+D1\}$ is shown as shaded areas in FIG. 3. When the SRAM 311 has a sufficient capacity, then the reading operation is directly continued. When the SRAM 311 does not have a sufficient capacity, then the reading operation is suspended and the SS processing is carried out.

FIG. 4B illustrates the state when the reading operation is suspended. At this point, it is determined whether or not the SRAM 311 has a capacity equal to or higher than the capacity required when an image having the length corresponding to $\{(Gmax-R2) \times 2+D2\}$ is read. When the SRAM 311 has such a capacity, then the reading operation is resumed. When the SRAM 311 does not have such a capacity, then the suspension of the reading operation is continued.

As described above, by performing as required the SS processing within the one-face reading region (within the first region) just before the start of the two-face reading region (or the second region), a risk of a deteriorated read image can be avoided that may be caused when the SS processing is performed in the two-face reading region.

(Second embodiment)

Figure 5:
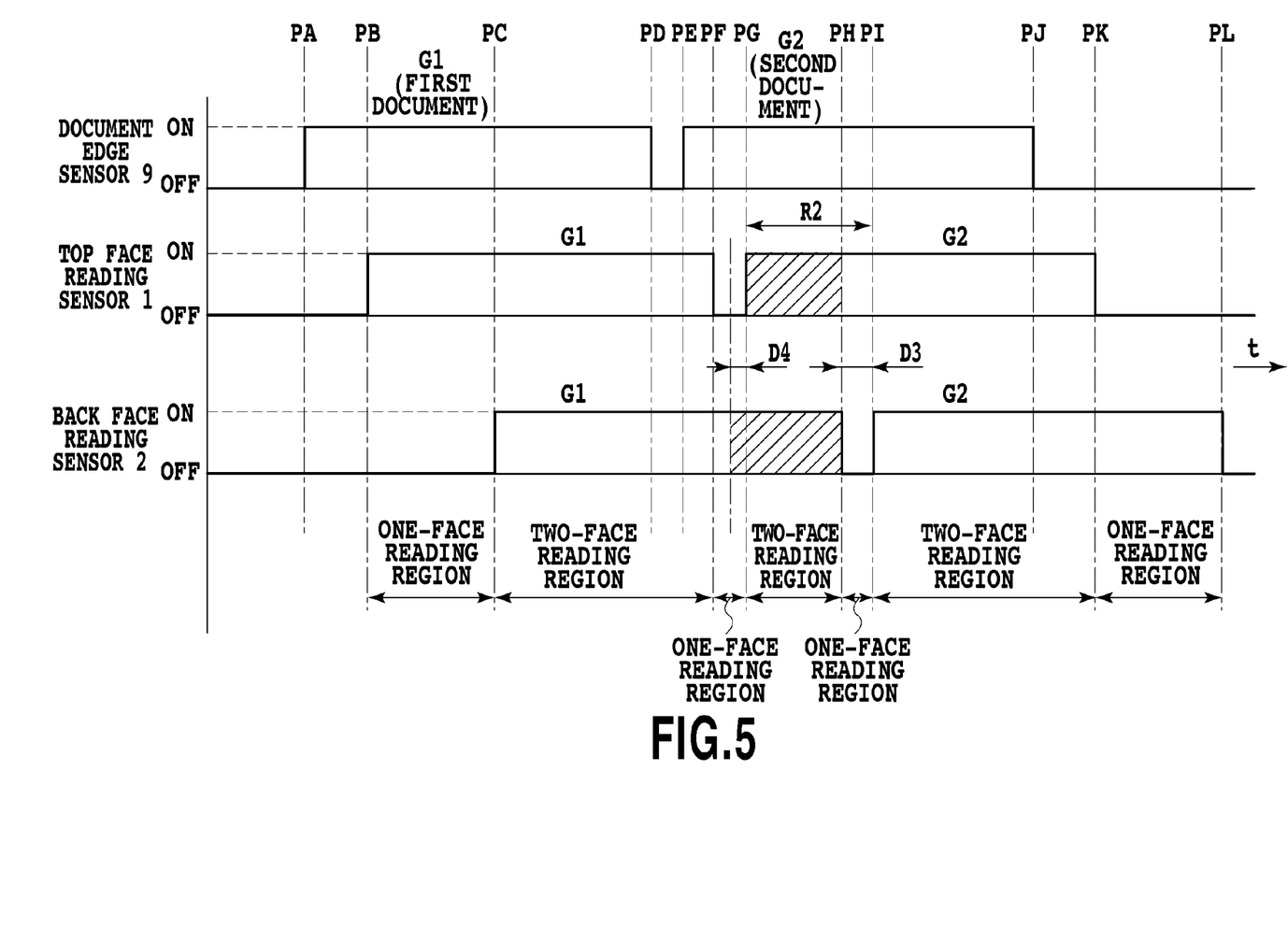
FIG. 5 is a timing chart for explaining the timing at which an image is read in the second embodiment of the present invention.
Figure 6A:
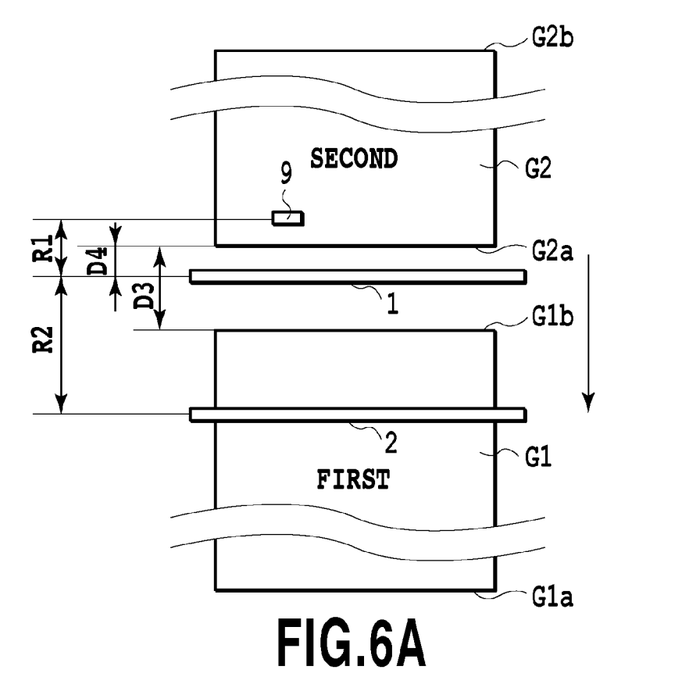
FIG. 6A and FIG. 6B are a schematic plan view illustrating a document at a different conveyance position in the second embodiment of the present invention, respectively.
Figure 6B:
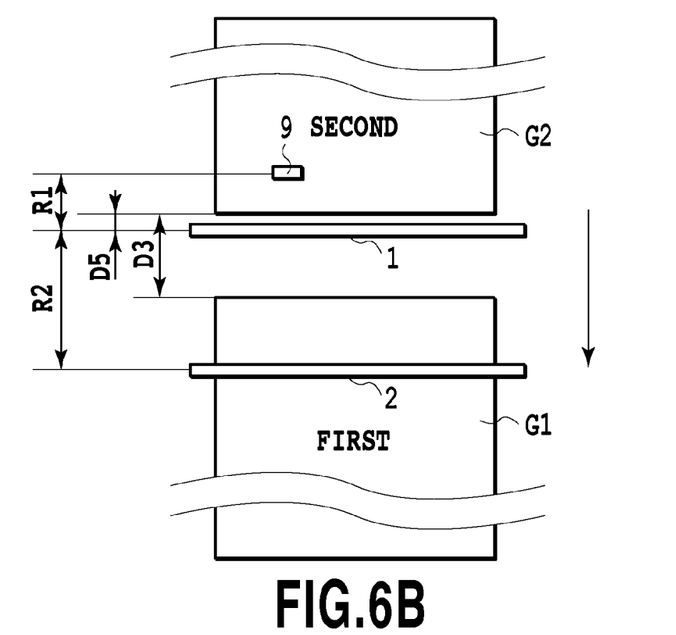

FIG. 5, FIG. 6A, and FIG. 6B illustrate the second embodiment of the present invention. FIG. 5 is a timing chart for explaining the states of the sensors 1, 2, and 9 when the two documents G are continuously conveyed from the document placement tray 10. Specifically, FIG. 5 illustrates, in a time-series manner, the state of the sensing by the document edge sensor 9 of the existence or non-existence of the document G, the state of the reading by the top face reading sensor 1, and the state of the reading by the back face reading sensor 2.

PA shows the timing at which the anterior end of the first document G1 reaches the position of the document edge sensor 9 and the document G1 is sensed. PB shows the timing at which the anterior end of the first document G1 reaches the position of the top face reading sensor 1 and the reading of the top face image is started. PC shows the timing at which the anterior end of the first document G1 reaches the position of the back face reading sensor 2 and the reading of the back face image is started. PD shows the timing at which the posterior end of the first document G1 passes the position of the document edge sensor 9 and the document G1 is no more sensed. PE shows the timing at which the anterior end of the second document G2 reaches the position of the document edge sensor 9 and the document G2 is sensed. PF shows the timing at which the posterior end of the first document G1 passes the position of the top face reading sensor 1. PG shows the timing at which the anterior end of the second document G2 reaches the position of the top face reading sensor 1 and the reading of the top face image of the document G2 is started. PH shows the timing at which the posterior end of the first document GL passes the position of the back face reading sensor 2. PI shows the position at which the anterior end of the second document G2 reaches the position of the back face reading sensor 2 and the reading of the back face image of the document G2 is started. PJ shows the timing at which the posterior end of the second document G2 passes the position of the document edge sensor 9 and the document G2 is no more sensed. PK shows the timing at which the posterior end of the second document G2 passes the position of the top face reading sensor 1. PL shows the position at which the posterior end of the second document G2 passes the position of the back face reading sensor 2. The above-described first embodiment can be used to prevent the SS processing from being performed within the two-face reading region within the zone from the timing PC to the timing PF and the zone from the timing PI to the timing PK.

FIG. 6A illustrates the state within the zone from the timing PF to the timing PG in FIG. 5 (i.e., within the one-face reading region). FIG. 6A is a plan view illustrating the positional relation among the first document G1, the second document G2, the document edge sensor 9, the top face reading sensor 1, and the back face reading sensor 2.

The positions of the top face reading sensor 1 and the back face reading sensor 2 are fixed and the documents G1 and G2 are conveyed in the direction shown by the arrow. R1 shows a distance from the detection position of the document edge sensor 9 to the reading position of top face reading sensor 1 (reading unit). R2 shows a distance from the reading position of the top face reading sensor 1 (reading unit) to the reading position of the back face reading sensor 2 (reading unit). These distances R1 and R2 are a value unique to the reading apparatus. D3 shows a distance between the posterior end G1b of the first document G1 and the anterior end G2a of the second document G2. This distance D3 can be calculated by the driving pulse of the pulse motor as a driving source (not shown) within a period from the sensing by the document edge sensor 9 of the posterior end G1b of the first document G1 to the sensing of the anterior end G2a of the second document G2. D4 shows a distance required to securely stop the document G2 being conveyed at a position in front of the reading position of the top face reading sensor 1. At this timing, it is determined whether the SRAM 311 has a capacity equal to or higher than a predetermined capacity required when an image having the length corresponding to the distance $\{(R2-D3) \times 2+D4\}$ is read by the top face reading sensor 1 and the back face reading sensor 2. The length corresponding to $\{(R2-D3) \times 2+D4\}$ is shown as shaded areas in FIG. 5. When the SRAM 311 has such a sufficient capacity, then the reading operation is directly continued. When the RAM 311 does not have such a capacity, then the reading operation is suspended and the SS processing is performed. FIG. 6B illustrates the state where the reading operation is suspended. At this timing, it is determined whether the SRAM 311 has a capacity required when an image having the length corresponding to the distance {(R2−D3)×2+D5} is read by the top face reading sensor 1 and the back face reading sensor 2. When the SRAM 311 has such a sufficient capacity, then the reading operation is resumed. When the RAM 311 does not have such a capacity, then the suspension of the reading operation is continued. As described above, the SS processing is performed as required prior to the zone from the timing PG to the timing PH (i.e., prior to the two-face reading region within which the top face image of the second document G2 is read by the top face reading sensor 1 and the back face image of the first document G1 is read by the back face reading sensor 2). This can consequently prevent the SS processing from being performed when after the two-face reading region within the zone from the timing PG to the timing PH is entered.

As described above, by performing the SS processing as required before the two-face reading region is entered, a risk of a deteriorated read image can be avoided that may be caused when the SS processing is performed after the two-face reading region is entered. Furthermore, the SS processing can be performed at an optimal timing by changing the free capacity of the buffer memory for performing the SS processing depending on the interval between the front and rear documents G1 and G2 or by changing the free capacity of the buffer memory for resuming the reading operation depending on the interval between the front and rear documents G1 and G2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-188637, filed Aug. 31, 2011, which is hereby incorporated by reference herein in its entirety.

What is claimed is:

1. An image reading apparatus, comprising:
   a conveyance unit configured to convey a document along a conveyance path;
   a first reading unit configured to read images of a top face of the document conveyed by the conveyance unit and a second reading unit configured to read images of a back face of the document conveyed by the conveyance unit, the second reading unit being positioned on a downstream side of the first reading unit in a conveying direction of the document;
   a storage control unit configured to store image data of the images read by the first reading unit and the second reading unit in a memory; and
   a control unit configured to perform an interruption processing for interrupting the reading of the image by the first reading unit and the second reading unit,
   wherein if a free capacity of the memory is smaller than the capacity required for the first reading unit and the second reading unit to read images, the control unit performs the interruption processing at a timing in which the conveyance of the document whose image on the top face has been read at least partially by the first reading unit is stopped in front of the second reading unit, such that the document has reached the first reading unit and has not reached the second reading unit.

2. The image reading apparatus according to claim 1, wherein
   after the interruption processing, the control unit resumes the conveyance of the document by the conveyance unit and the reading of the images by the first reading unit and the second reading unit so as to prevent already-read image data corresponding to a predetermined number of lines from being read in an overlapped manner.

3. The image reading apparatus according to claim 1, further comprising
   a determination unit configured to determine whether a free capacity of the memory is smaller than a capacity required for the reading of the images by the first reading unit and the second reading unit during a predetermined period within which the first reading unit and the second reading unit read the images,
   wherein another period is a period within which the document is conveyed in a first region of the conveyance path and the predetermined period is a period within which the document is conveyed in a second region of the conveyance path.

4. The image reading apparatus according to claim 3, wherein
   the control unit performs the interruption processing so as to prevent, when the conveyance of the document by the conveyance unit is interrupted, the document from entering from the first region to the second region.

5. The image reading apparatus according to claim 1, wherein
   the control unit resumes, after performing the interruption processing, the conveyance of the document by the conveyance unit and the reading of the images by the first reading unit and the second reading unit when the memory gets a free capacity equal to or higher than a capacity required for the first reading unit and the second reading unit to read the images.

6. The image reading apparatus according to claim 1, wherein
   the conveyance unit conveys a plurality of documents continuously, and
   the control unit changes the free capacity of the memory for performing the interruption processing depending on an interval between a preceding document that is precedingly conveyed by the conveyance unit and a subsequent document that is subsequently conveyed.

7. The image reading apparatus according to claim 1, wherein
   the conveyance unit conveys a plurality of documents continuously, and
   the control unit resumes, after performing the interruption processing, the conveyance of the document by the conveyance unit and the reading of the images by the first reading unit and the second reading unit when the memory gets a free capacity equal to or higher than a predetermined capacity, the predetermined capacity being changed depending on an interval between a preceding document that is precedingly conveyed by the conveyance unit and a subsequent document that is subsequently conveyed.

8. An image reading method, comprising:
   reading, by a first reading unit images on a top face of a document conveyed along a conveyance path and by a second reading unit images of back face of the document conveyed along the conveyance path, the second reading unit being positioned on a downstream side of the first reading unit in a conveying direction of the document;
   storing image data of the images read by the first reading unit and the second reading unit in a memory; and
   performing an interruption processing for interrupting the reading of the images by the first reading unit and the second reading unit, wherein if it is determined that a free capacity of the memory is smaller than the capacity required for the first reading unit and the second reading unit to read images, the interruption processing is performed at a timing in which the conveyance of the document whose image on the top face has been at least partially read by the first reading unit is stopped in front of the second reading unit, such that the document has reached the first reading unit and has not reached the second reading unit.

9. The image reading method according to claim 8, wherein after the interruption processing, the conveyance of the document and the reading of the images by the first reading unit and the second reading unit are resumed so as to prevent already-read image data corresponding to a predetermined number of lines from being read in an overlapped manner.

10. The image reading method according to claim 8, further comprising determining whether a free capacity of the memory is smaller than a capacity required for the reading of the images by the first reading unit and the second reading unit during a predetermined period within which the first reading unit and the second reading unit read the images,
wherein another period is a period within which the document is conveyed in a first region of the conveyance path and the predetermined period is a period within which the document is conveyed in a second region of the conveyance path.

11. The image reading method according to claim 10, wherein
the interruption processing is performed so as to prevent, when the conveyance of the document is interrupted, the document from entering from the first region to the second region.

12. The image reading method according to claim 8, wherein
the control unit resumes, after performing the interruption processing, the conveyance of the document and the reading of the images by the first reading unit and the second reading unit are performed when the memory gets a free capacity equal to or higher than a capacity required for the first reading unit and the second reading unit to read the images.

13. The image reading method according to claim 8, wherein
a plurality of documents are continuously conveyed, and
the free capacity of the memory for performing the interruption processing is changed depending on an interval between a preceding document that is precedingly conveyed and a subsequent document that is subsequently conveyed.

14. The image reading method according to claim 8, wherein
a plurality of documents are continuously conveyed, and
after performing the interruption processing, the conveyance of the document and the reading of the images by the first reading unit and the second reading unit are resumed when the memory gets a free capacity equal to or higher than a predetermined capacity, the predetermined capacity being changed depending on an interval between a preceding document that is precedingly conveyed and a subsequent document that is subsequently conveyed.

\* \* \* \* \*